US012748384B2

(12) United States Patent
Saito et al.

(10) Patent No.: US 12,748,384 B2
(45) Date of Patent: Sep. 29, 2026

(54) ELECTRONIC TIMEPIECE, HAND POSITION DETECTION METHOD AND STORAGE MEDIUM

(71) Applicant: CASIO COMPUTER CO., LTD., Tokyo (JP)

(72) Inventors: Yuta Saito, Tokyo (JP); Tomohiro Inaba, Tokyo (JP); Hua Gao, Tokyo (JP); Yohei Kawaguchi, Tokyo (JP); Akihiro Kuroha, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 364 days.

(21) Appl. No.: 18/604,156

(22) Filed: Mar. 13, 2024

(65) Prior Publication Data

US 2024/0310789 A1 Sep. 19, 2024

(30) Foreign Application Priority Data

Mar. 14, 2023 (JP) ................................ 2023-039256

(51) Int. Cl.
*G04D 7/00* (2006.01)

(52) U.S. Cl.
CPC .................................. *G04D 7/004* (2013.01)

(58) Field of Classification Search
CPC ..................................................... G04D 7/004
See application file for complete search history.

(56) References Cited

U.S. PATENT DOCUMENTS

2010/0020336 A1* 1/2010 Hosobuchi ............... G04C 3/14
356/614

FOREIGN PATENT DOCUMENTS

JP 2824450 B2 * 11/1998
JP 2002071847 A * 3/2002
JP 2011-69620 A 4/2011
JP 5267244 B2 * 8/2013

* cited by examiner

*Primary Examiner* — John E Breene
*Assistant Examiner* — Alex T Devito
(74) *Attorney, Agent, or Firm* — CHEN YOSHIMURA LLP

(57) ABSTRACT

An electronic timepiece includes a plurality of hands; a plurality of detection units that detect external light, arranged corresponding to the plurality of hands; and a control unit, wherein the control unit is configured to perform external light detection operations that respectively determine whether or not external light of a threshold value or more is detected at the plurality of detection units while moving the plurality of hands by a predetermined distance, respectively, and when there is a hand among the plurality of hands for which the external light detection operation detected external light and there is another hand among the plurality of hands for which the external light detection operation did not detect external light, perform the external light detection operation for said another hand again.

17 Claims, 12 Drawing Sheets

ELECTRONIC TIMEPIECE, HAND POSITION DETECTION METHOD AND STORAGE MEDIUM

BACKGROUND OF THE INVENTION

Technical Field

The present invention relates to an electronic timepiece, a hand position detection method, and a storage medium.

Background Art

Conventionally, in watches/timepieces that display the time by rotating the hands, if the watch is affected by a strong magnetic field or is subjected to a strong shock, the drive system of the hands may become distorted, causing the actual hands to become distorted. As a result, the hand position may deviate from the hands position designated by the control unit.

In order to detect such a deviation in the position of the hands, there are known watches that are equipped with a hand position detection function in which, for example, through holes that transmit light are provided in a plurality of gears that constitute a wheel train mechanism that rotates the hands and rotates in conjunction with the hands, and in which it can be confirmed that the hands are placed at specific time positions by detecting, using various light-receiving elements, the state in which the through holes are overlapped at predetermined positions.

For example, in the watch described in Japanese Patent Application Laid-open No. 2011-69620 ("analog electronic watch"), a light receiving element for detecting external light is installed at positions corresponding to through holes ("transmission holes") formed in interlocking gears, and the hand position is detected by detecting external light with the light receiving element when the through holes of a plurality of gears overlap and the light is allowed to pass therethrough.

SUMMARY OF THE INVENTION

In the related art technology described above, when detecting external light with a light-receiving element, the light-receiving element may not detect the external light with sufficient illuminance due to influence of the shadow of other parts such as the hands, thereby resulting a detection failure. Among other things, which are apparent from the descriptions below, the present invention addresses such problems of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic timepiece, comprising: a plurality of hands; a plurality of detection units that detect external light, arranged corresponding to the plurality of hands; and a control unit, wherein the control unit is configured to perform the following: performing external light detection operations that respectively determine whether or not external light of a threshold value or more is detected at the plurality of detection units while moving the plurality of hands by a predetermined distance, respectively, and when there is a hand among the plurality of hands for which the external light detection operation detected external light and there is another hand among the plurality of hands for which the external light detection operation did not detect external light, performing the external light detection operation for said another hand again.

In other aspects, the present disclosure provides a method for hand position detection executed by a control unit of the electronic timepiece having the above-described features and a non-transitory computer readable storage medium that stores a program executable by the control unit to perform the above-described features of the electronic timepiece.

It is to be understood that both the foregoing general description and the following detailed description are exemplary and explanatory, and are intended to provide further explanation of the invention as claimed.

DETAILED DESCRIPTION OF EMBODIMENTS

Hereinafter, embodiments of an electronic timepiece, a hand position detection method, and a storage medium according to the present invention will be described with reference to FIGS. 1 to 18. Note that the embodiments described below have various limitations that are technically preferable for carrying out the present invention, but the scope of the present invention is not limited to the following embodiments and illustrated examples.

<Construction>

Figure 1:
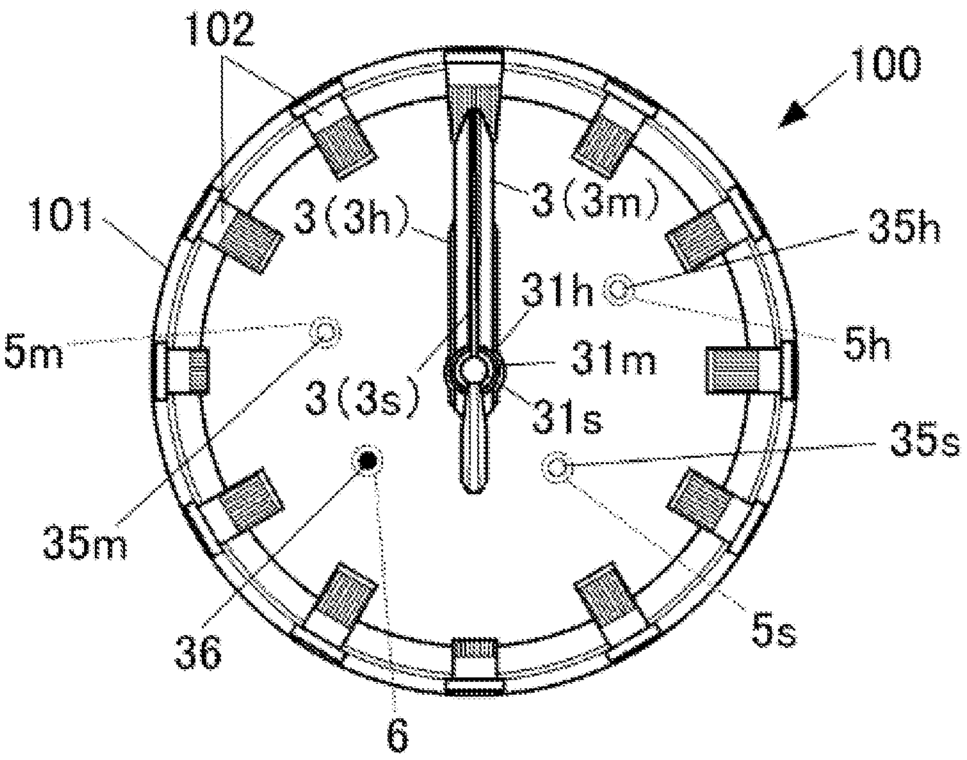
FIG. 1 is a front view schematically showing a timepiece according to an embodiment.

FIG. 1 is a front view showing the appearance of the main parts of a timepiece in this embodiment. As shown in FIG. 1, an electronic watch/timepiece of this embodiment (hereinafter simply referred to as "timepiece 100") includes a plurality of hands (hereinafter simply referred to as "hands 3"). This is an analog timepiece that displays the time by appropriately pointing the hour indicators 102, for example, arranged along the periphery of the watch face by the hands 3 (second hand 3*s*, minute hand 3*m*, and hour hand 3*h*, which will be described later). In addition, when it is simply referred to as "hand 3" below, it shall mean the second hand 3*s*, the minute hand 3*m*, and/or the hour hand 3*h*.

Drive mechanisms 30 (a second hand drive mechanism 30*s*, a minute hand drive mechanism 30*m*, and an hour hand drive mechanism 30*h* to be described later) that rotationally drive the hands 3 are assembled and mounted on a module 10 and housed in a device case 101.

Note that the hands 3 included in the timepiece 100 are not limited to the second hand 3*s*, the minute hand 3*m*, and the hour hand 3*h*. For example, it may include function hands that display various functions other than time. In this case, a separate drive mechanism for the function hand is provided.

Figure 2:
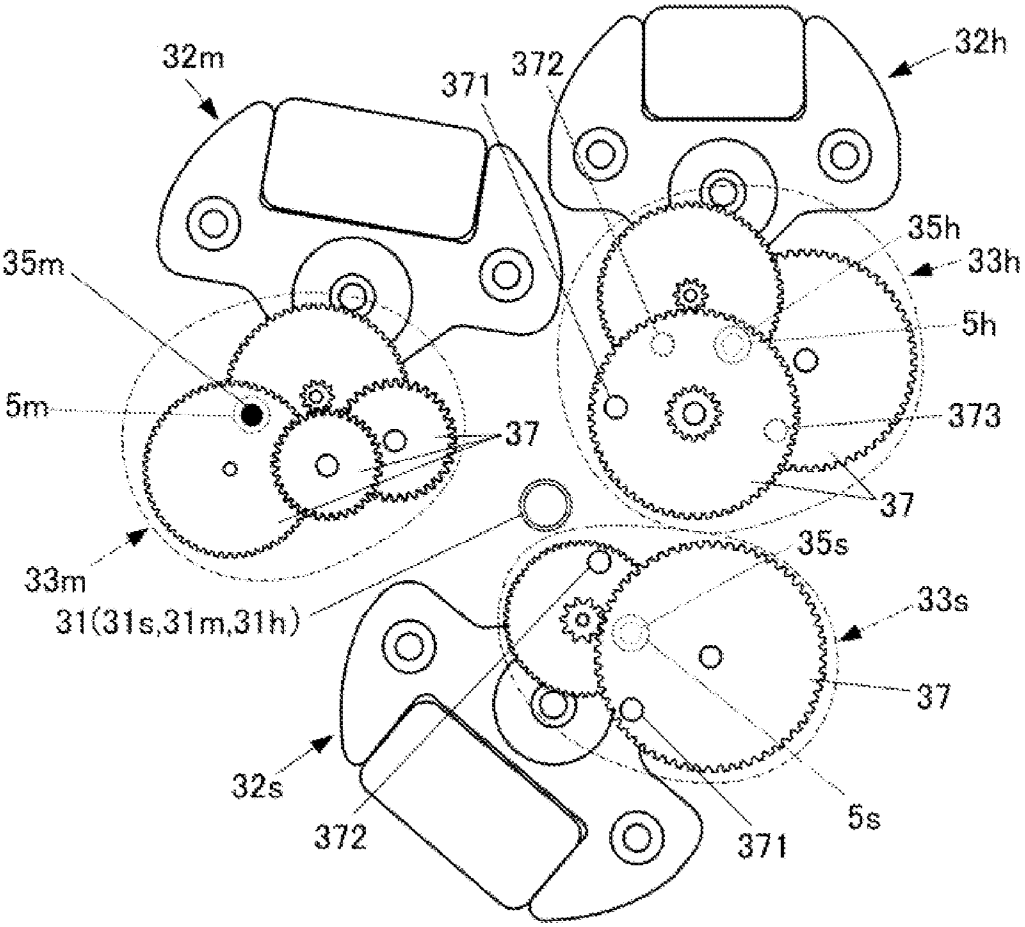
FIG. 2 is a plan view of a main part showing a part of a module provided in the timepiece shown in FIG. 1.

FIG. 2 is a plan view schematically showing the main parts of the hands drive mechanisms assembled in the module. Further, FIG. 3 is a block diagram showing the main control configuration of the timepiece (a module provided in the watch).

As described above, the timepiece 100 of the present embodiment includes a second hand 3*s*, a minute hand 3*m*, and an hour hand 3*h* as the plurality of hands 3, and each is provided with a drive mechanism 30 that rotationally drives the corresponding hand 3.

Figure 3:
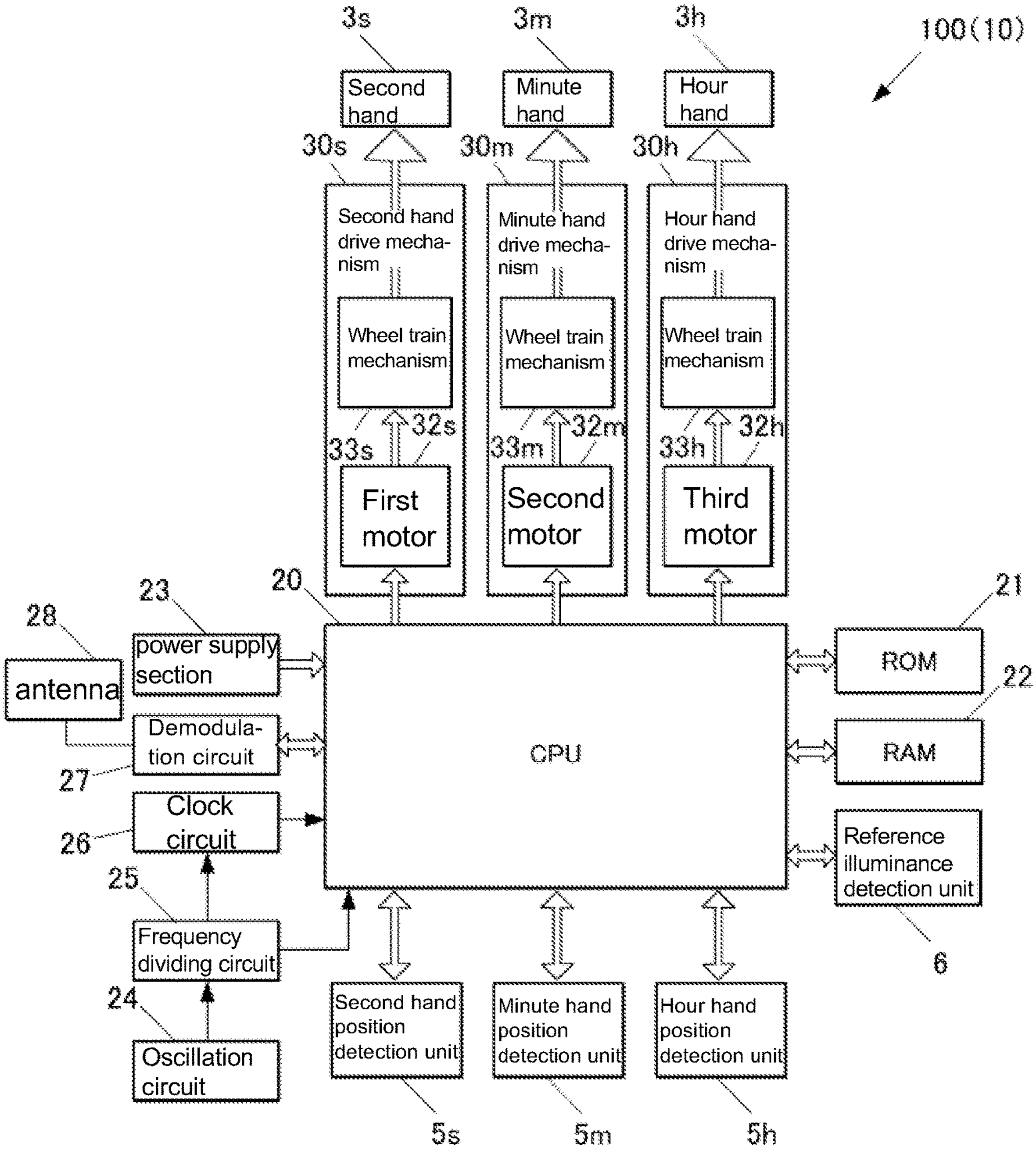
FIG. 3 is a block diagram showing the main control configuration of the timepiece of the present embodiment.

That is, as shown in FIGS. 2 and 3, the timepiece 100 includes a second hand drive mechanism 30*s* that rotationally drives the second hand 3*s*, a minute hand drive mechanism 30*m* that rotationally drives the minute hand 3*m*, and an hour hand drive mechanism 30*h* that rotationally drives the hour hand 3*h*, thereby each hand 3 being driven independently. Note that the mechanism for driving the hands 3 is not limited to the case where each hands 3 is provided with an independent drive mechanism 30 as described above. For example, the three hands 3 may be driven by two drive mechanisms, one for driving the second hand 3*s* and the other for driving the minute hand 3*m* and hour hand 3*h*.

The second hand drive mechanism 30*s* includes a first motor 32*s* and a wheel train mechanism 33*s* that transmits the driving force of the first motor 32*s* to the second hand 3*s*.

The minute hand drive mechanism 30*m* includes a second motor 32*m* and a wheel train mechanism 33*m* that transmits the driving force of the second motor 32*m* to the minute hand 3*m*.

The hour hand drive mechanism 30*h* includes a third motor 32*h* and a wheel train mechanism 33*h* that transmits the driving force of the third motor 32*h* to the hour hand 3*h*.

In this disclosure, when it is simply referred to as "drive mechanism 30" below, it shall mean the second hand drive mechanism 30*s*, the minute hand drive mechanism 30*m*, and/or the hour hand drive mechanism 30*h*.

Further, in the following, when it is simply referred to as "motor 32", it means the first motor 32*s*, the second motor 32*m*, and/or the third motor 32*h*.

Further, in the following, when it is simply referred to as "wheel train mechanism 33", it means the wheel train mechanism 33*s* the wheel train mechanism 33*m*, and/or the wheel train mechanism 33*h*.

In addition, in FIG. 2, the wheel train mechanism 33 corresponding to each hand 3 (second hand 3*s*, minute hand 3*m*, hour hand 3*h*) is shown surrounded by a chain line.

The wheel train mechanism 33*s* of the second hand drive mechanism 30*s* is composed of a plurality of gears 37, such as the fourth wheel and pinion (second hand wheel), for example. The fourth wheel and pinion (second hand wheel) have a second hand shaft 31*s* erected at the center of rotation. The second hand shaft 31*s* is inserted into a minute hand shaft 31*m* and an hour hand shaft 31*h* (described later), which are configured as hollow tubular shafts, and projects toward the viewing side of the timepiece 100. The second hand shaft 31*s*, the minute hand shaft 31*m*, and the hour hand shaft 31*h* have a common rotation center.

The second hand 3*s* is fixed to a protruding portion of the second hand shaft 31*s*.

A through hole penetrating in the thickness direction is formed in all or some of the gears 37 constituting the wheel train mechanism 33*s* (in FIG. 2, through holes 371, 372, etc., are formed in order from the gear 37 that is disposed on the front side). While the second hand 3*s* makes one revolution (one rotation clockwise), the through holes 371 372, and 373 of the respective gears 37 are aligned only once, and a penetrating state is achieved in which the through holes 371, 372, and 373 of the respective gears 37 penetrate in the thickness direction of the timepiece 100 to form the penetrating state of the light-transparent section 35 (the light transmissible section 35*s* in FIGS. 1, 2, etc.; in FIG. 2, since the light-transmissible section 35*s* is not in the penetrating state, it is shown by a thin broken line). The positions of the gears where the light-transmissible section 35 (the light-transmissible section 35*s* in FIGS. 1, 2, etc.) becomes the penetrating state are called the penetrating positions of the gears.

Further, the wheel train mechanism 33*m* of the minute hand drive mechanism 30*m* is composed of a plurality of gears 37, such as the center wheel and pinion (minute wheel), for example. On the center wheel and pinion (minute wheel), a minute hand shaft 31*m* configured as a hollow tubular shaft is erected at the center of rotation. The minute hand shaft 31*m* is inserted into an hour hand shaft 31*h* (described later), which is also configured as a hollow tubular shaft, and projects toward the viewing side of the timepiece 100. A minute hand 3*m* is fixed to a protruding portion of the minute hand shaft 31*m*.

Figure 16:
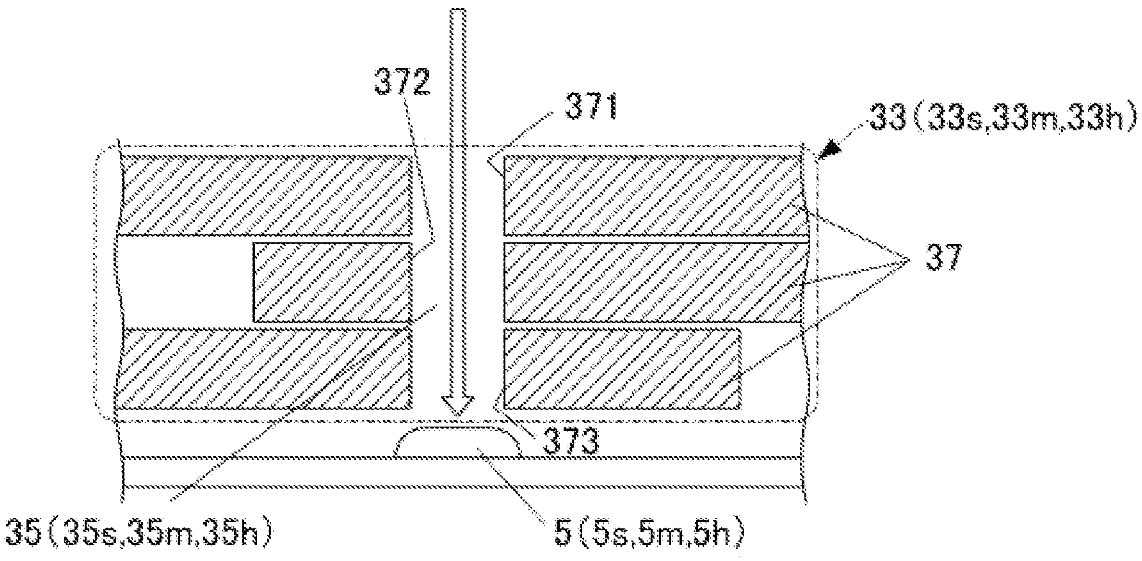
FIG. 16 is a cross-sectional view of a main part schematically showing the relationship between the wheel train mechanism and the detection unit when the light-transmissible section for detecting the hands position of the hands is in the penetrating state.

A through-hole penetrating in the thickness direction is formed in all or some of the gears 37 constituting the wheel train mechanism 33*m* (see through-holes 371, 372, 373 in FIGS. 2, 16, etc.). The through-hole of each gear 37 (for example, the through-holes 371, 372, and 373 in the schematic diagram of FIG. 16) are aligned only once during one revolution of the minute hand 3*m*, and a penetrating state is achieved in which the through holes 371, 372, and 373 of the respective gears 37 penetrate in the thickness direction of the timepiece 100 to form the penetrating state of the light-transparent section 35 (the light transmissible section 35*m* in FIGS. 1, 2, etc. In FIG. 2, only the light-transmissible section 35*m* corresponding to the minute hand 3*m* is in the penetrating state, which is indicated by a black circle.). The positions of the gears where the light-transmissible section 35 (the light-transmissible section 35*m* in FIGS. 1, 2, etc.) becomes the penetrating state are called the penetrating positions of the gears.

Further, the wheel train mechanism 33*h* of the hour hand drive mechanism 30*h* is composed of a plurality of gears 37, such as the minute wheel and the hour wheel. The hour wheel has an hour hand shaft 31*h* configured as a hollow tubular shaft erected at the center of rotation. As described above, the minute hand shaft 31*m* and the second hand shaft 31*s* are inserted into the hollow hour hand shaft 31*h*.

An hour hand 3*h* is fixed to the hour hand shaft 31*h*.

All or some of the gears 37 constituting the wheel train mechanism 33*h* are formed with a through hole penetrating in the thickness direction (in FIG. 2, through holes 371, 372, 272 are formed in order from the gear 37 disposed on the front side. The through holes 372 and 373, which are arranged on the lower side and are not visible, are shown by broken lines). The through holes of the respective gears 37 (for example, through holes 371, 372, and 373 in the schematic diagram of FIG. 16) are aligned once every 24 hours (for example, once during two revolutions of the hour hand 3*h* in the case of a 12-hour clock) to form the penetrating state of the light-transparent section 35 (the light transmissible section 35*h* in FIGS. 1, 2. In FIG. 2, the light-transmissible section 35*h* is not in the penetrating state, and therefore is indicated by a thin broken line). The positions of the gears where the light-transmissible section 35 (the light-transmissible section 35*h* in FIGS. 1, 2, etc.) becomes the penetrating state are called the penetrating positions of the gears.

The motor 32 of each drive mechanism 30 (i.e., the first motor 32*s*, the second motor 32*m*, and the third motor 32*h*) is, for example, a bipolar magnetized stepping motor, and when a drive pulse is applied, is driven according to the number of input pulses.

For example, the second hand 3*s* is driven by the first motor 32*s* in 6 degree steps (6 degrees per second), and rotates around the second hand shaft 31*s* in 60 seconds (60 steps). Further, the minute hand 3*m* is driven by the second motor 32*m*, and the hour hand 3*h* is driven by the third motor 32*h*, each in 1 degree steps, and each is appropriately slowed down by the gears 37 forming the corresponding wheel train mechanisms 33. As a result, the minute hand 3*m* is configured to make one rotation around the minute hand shaft 31*m* in one hour, and the hour hand 3*h* is configured to make one rotation around the hour hand shaft 31*h* in 12 hours. Note that, since the minute hand 3*m* and the hour hand 3*h* are driven in steps of one degree in this manner, the time required for one rotation (one rotation around the axis) is longer than that for the second hand 3*s*.

In addition, the timepiece 100 of the present embodiment includes a plurality of detection units 5 (second hand position detection unit 5*s*, minute hand position detection unit 5*m*, hour hand position detection unit 5*h*; when simply referred to as "detection unit 5", these detection units are referenced) arranged corresponding to the plurality of hands 3. (See FIGS. 1, 2, 16, etc.).

Specifically, the detection unit 5 is arranged at a position where the detection unit 5 can detect the external light incident from the light transmissible section 35 that is made in the penetrating state due to the alignment of the through holes of the gears 37 (the through holes 371, 372, 373 in FIGS. 2 and 16) in the wheel train mechanism 33. The detection unit 5 (the second hand position detection unit 5*s*, the minute hand position detection unit 5*m*, the hour hand position detection unit 5*h*) is composed of, for example, a phototransistor. Note that the detection unit 5 is not limited to a phototransistor as long as it can detect external light.

Note that the detection unit 5 is arranged on the back side of the light-transmitting section 35 (the back side in the thickness direction of the timepiece 100 when viewed from the viewing side). In FIG. 1, only the light-transmissible section 36 corresponding to a reference illuminance detection unit 6, which is described later, is in the penetrating state, and the other detection units 5 (the second hand position detection unit 5*s*, the minute hand position detection unit 5*m*, the hour hand position detection unit 5*h*) are in the non-penetrating state. In the figure, only the light-transmissible section 36 that is in the penetrating state is indicated by a black circle, and the light-transmissible section 35 (that is, the light-transmissible sections 35*s*, 35*m*, and 35*h*) that is not penetrating is indicated by an open circle.

In addition, in FIGS. 1, 2, and 7 to 15, the penetrating state in which the through holes of the gears 37 (through holes 371, 372, and 373 in FIGS. 2 and 16) are aligned in the light-transmissible section 35 in the thickness direction of the timepiece 100 is indicated by a black circle, and the non-penetrating state in which the through holes (through holes 371, 372, and 373 in FIGS. 2 and 16) are misaligned and the light-transmissible section 35 does not penetrate is shown in a white empty circle.

Further, in this embodiment, the timepiece 100 includes a reference illuminance detection unit 6. The reference illuminance detection unit 6 detects the amount of external light at a place where the timepiece 100 is placed, and the timepiece 100 has a light-transmitting section 36 formed at a position corresponding to the reference illuminance detection unit 6. The light-transmitting section 36 is not like the light-transmissible section 35 (35*s*, 35*m*, 35*h*), which can switch between the penetrating state and the non-penetrating state depending on the movement positions of the gears 37, corresponding to the detection unit 5 (the second hand position detection unit 5*s*, the minute hand position detection unit 5*m*, and the hour hand position detection unit 5*h*), but functions as an opening that penetrates at all times to take in external light. Note that the light-transmitting section 36 may have a non-penetrating state as appropriate.

The reference illuminance detection unit 6 is composed of, for example, a phototransistor. Note that the reference illuminance detection unit 6 may be any device that can detect external light, and is not limited to a phototransistor.

FIGS. 1, 2, 7 to 15 schematically illustrate the light-transmissible sections 35 (35*s*, 35*m*, 35*h*) corresponding to the respective hands 3 and the detection units 5 (second hand position detection part 5*s*, minute hand position detection part 5*m*, hour hand position detection unit 5*h*) associated therewith, the light-transmitting section 36, and the reference illuminance detection unit 6 provided correspondingly, and do not illustrate the specific details of each part.

Further, FIGS. 2, 16, etc., schematically illustrate the configuration to the extent necessary for explanation, and do not show the arrangement, number, etc., of the gears 37 in the actual wheel train mechanism 33 in precise detail.

In addition, as shown in FIG. 3, the timepiece 100 includes a CPU (Central Processing Unit) 20, a ROM (Read Only Memory) 21, a RAM (Random Access Memory) 22, a power supply section 23, an oscillation circuit 24, a frequency dividing circuit 25, a clock circuit 26, an antenna 28, a demodulation circuit 27, and the like.

The CPU 20 performs various arithmetic operations in the analog electronic timepiece 1 and also performs control of the overall operation. In this embodiment, the CPU 20 functions as a control unit that controls the hand position detection operation.

The RAM 22 is a volatile memory that provides a working memory space to the CPU 20 and stores expanded programs, temporary data, and the like. Further, the RAM 22 stores information such as the hand positions of the plurality of hands 3 (i.e., the second hand 3*s*, the minute hand 3*m*, and the hour hand 3*h*).

The ROM 21 is a nonvolatile memory that stores a control program for the timepiece 100 executed by the CPU 20 and operation programs related to various functions such as a function to perform hand position detection processing. Further, the ROM 21 appropriately stores various data necessary for the hand position detection operation and the like.

The power supply unit 23 supplies power to each section of the timepiece 100 via the CPU 20. The configuration of the power supply unit 23 is not particularly limited, but may be, for example, a combination of a solar cell and a secondary battery.

The oscillation circuit 24 oscillates and outputs a predetermined frequency signal.

The frequency dividing circuit 25 divides the frequency signal input from the oscillation circuit 24 to generate and output various frequency signals used in the timepiece 100.

The clock circuit 26 counts the one second periodic signal output from the frequency dividing circuit 25 and adds it to the time data every second so as to hold the current time.

The demodulation circuit 27 is a circuit that demodulates a signal from radio waves received using the antenna 28. The demodulation circuit 27 receives the standard radio wave through the antenna 28 and demodulates the time code.

The demodulated time code is decoded and interpreted by the CPU 20 so that the CPU 20 obtains the current time.

Additionally, this current time data is sent from the CPU 20 to the clock circuit 26, where the current time data is overwritten and corrected.

Note that the components installed in the module 10 are not limited to those illustrated here. Furthermore, these CPU 20, ROM 21, RAM 22, oscillation circuit 24, frequency dividing circuit 25, clock circuit 26, demodulation circuit 27, etc., may be mounted on a circuit board (not shown), etc., and/or may be implemented as an LSI (Large Scale Integration).

<Operations>

Next, with reference to FIGS. 4 to 18, etc., the operation of the timepiece 100 according to the present embodiment will be specifically explained, particularly regarding the hand position detection method.

Figure 4:
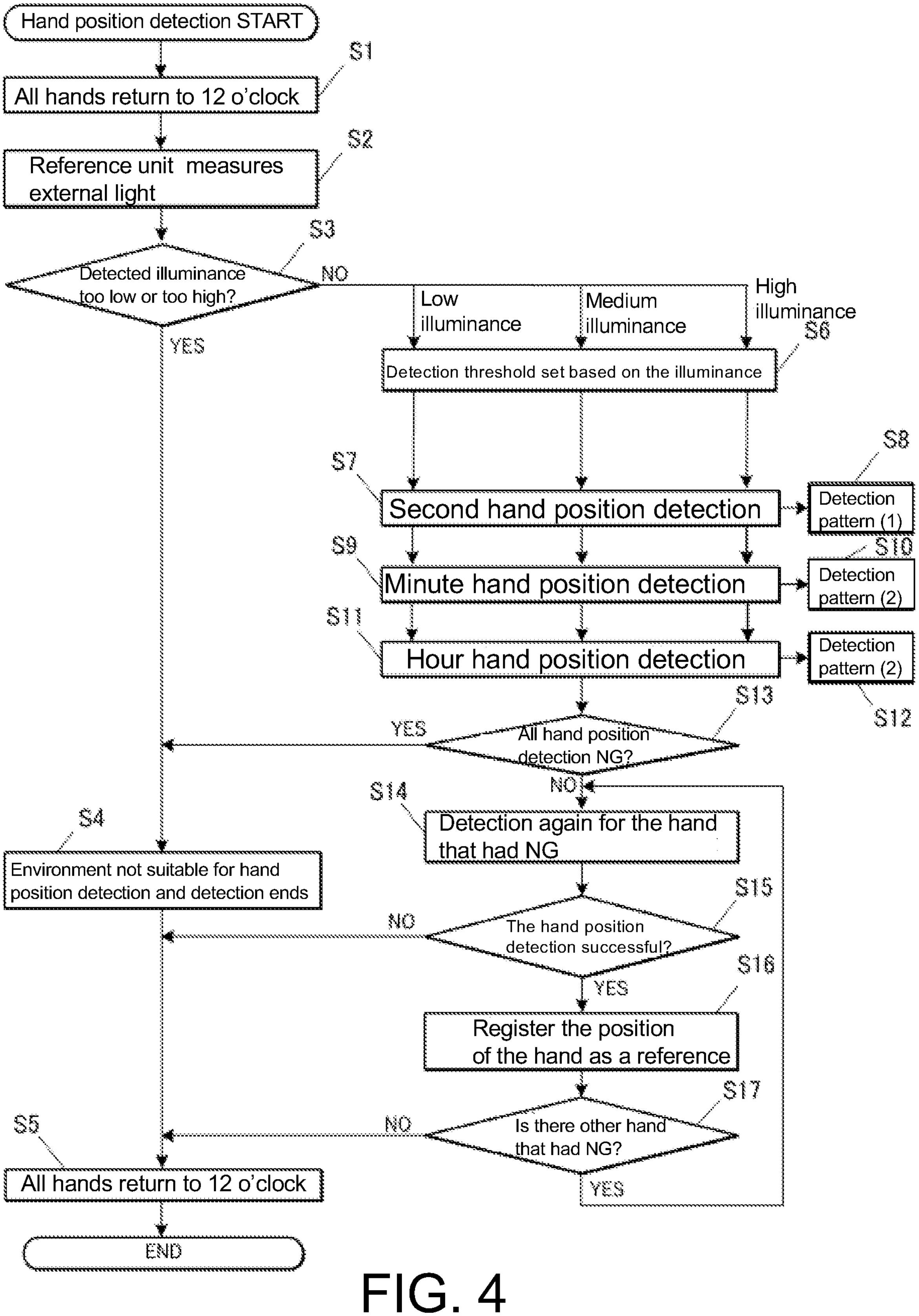
FIG. 4 is a flowchart which shows an overall process of hands position detection in this embodiment.

FIG. 4 is a flowchart showing the overall flow of hand position detection performed in the timepiece 100.

As shown in FIG. 4, when performing hand position detection, first, all hands 3 (second hand 3*s*, minute hand 3*m*, hour hand 3*h*) are returned to the 12 o'clock position (step S1). FIG. 1 is a schematic front view of the timepiece 100 in which all hands 3 have returned to the 12 o'clock position. Note that it is sufficient that all the hands 3 are placed at the same position, and the position is not necessarily limited to the 12 o'clock position.

Next, the reference illuminance detection unit 6 measures (detects) external light entering from the light-transmitting section 36 (step S2). The detection result by the reference illuminance detection unit 6 is acquired by the CPU 20, which is a control unit.

Based on the detection result of the reference illuminance detection unit 6, the CPU 20 determines whether the illuminance is too high or too low to be unsuitable for hands position detection (step S3). For example, if the timepiece 100 is placed in a dark room or the like, it is difficult for sufficient external light to enter, making it impossible to obtain the illuminance necessary to obtain accurate (reliable) detection results. Conversely, when the timepiece 100 is placed outdoors on a sunny day, external light may enter through a small gap even if the light-transmissible section 35 is not in the penetrating state. In this case as well, accurate (reliable) detection results cannot be obtained.

Note that the environment in which the hand position detection can be performed satisfactorily is when the external environment in which the timepiece 100 is placed has an illuminance of 500 Lx or more to about 50,000 Lx.

Therefore, if the illuminance detected by the reference illuminance detection unit 6 exceeds, for example, 50,000 Lx, the CPU 20 determines that the illuminance is too high to be suitable for hands position detection, and if it is less than, for example, 500 Lx, the CPU 20 determines that the illuminance is too low to be suitable for hands position detection.

If it is determined that the illuminance is too high or too low to be suitable for hand position detection (step S3; YES), the CPU 20 determines that the timepiece 100 is in an environment that is not suitable for hand position detection, and causes the detection operation to end (step S3). Note that in this case, the timepiece 100 may have a mechanism that notifies the user through a beep sound, light emission, or the like that detection could not be performed because the environment is not suitable for hand position detection.

In such a case, all hands 3 (second hand 3*s*, minute hand 3*m*, hour hand 3*h*) are returned to the 12 o'clock position (step S5), and the hand position detection process is ended.

On the other hand, if it is determined from the detection result of the reference illuminance detection unit 6 that the illuminance is not too high or too low to be unsuitable for hands position detection (step S3; NO), the CPU 20 sets a threshold value for detection by the detection unit 5 according to the illuminance (step S6).

For example, when the detected illuminance is low ("low illuminance" in FIG. 4), a low threshold is set so that the presence of external light is detected even at a relatively low illuminance. For example, if the detected illuminance is relatively high ("high illuminance" in FIG. 4), a high threshold is set so that when a certain degree of high illuminance is detected, it is detected that external light is incident. In the case of an intermediate value ("medium illuminance" in FIG. 4), a threshold value approximately intermediate between the two is set.

Note that the threshold value may be set in any number of stages. For example, thresholds are set in three stages: when the illuminance is low (for example, from 500 Lx to less than 2000 Lx), when the illuminance is high (for example, from about 10000 Lx to 50000 Lx), and when it is medium (for example, from 2000 Lx to less than 10000 Lx). Alternatively, the threshold levels may be divided into more finely divided levels.

Note that if the threshold level is strict (that is, if a high threshold is set), even if external light is actually incident, there is a possibility that it will not be detected as being incident. Conversely, when the threshold level is low (that is, when a low threshold is set), the threshold may be exceeded with the detected external light even if the light-transmissible section 35 is not in the penetrating state and should not be judged as detecting external light exceeding the threshold. Therefore, the threshold value should be appropriately set. For example, the threshold value may be set low at first, and if external light exceeding the threshold value cannot be properly detected, the threshold value may be reset in a stricter direction, as described below.

Here, "cannot be properly detected" refers to, for example, a case where external light exceeding a threshold value is detected at multiple locations.

That is, the detection unit 5 should detect external light exceeding the threshold value only when the light-transmitting section 35 is in the penetrating state. As described above, while the hand 3 is moved a predetermined distance, the position where the through holes 371, 372, 373 of the gear 37 of the wheel train mechanism 33 overlap and the light-transmissible section 35 becomes the penetrating state (see FIG. 16) should only occur at a single position. However, if the threshold value is set too low, if the light-transmissible section 35 is not actually completely penetrated or if there is light that is incident from a place other than the light-transmissible section 35, the threshold value may be exceeded, and as a result, the presence of external light may be falsely detected. For this reason, when the detection unit 5 detected external light exceeding the threshold value twice or more while it was supposed to be detected only once, it is determined to be a detection failure (NG,) as described later.

Once the threshold value is set, first, an attempt is made to detect the hand position of the second hand 3*s* (step S7). Note that the order of the hands in which hand position detection is performed is not limited to starting from the second hand 3*s*, but in a multi-hand watch, the positional deviation of the second hand 3*s* is most noticeable, and the deviation is a concern for the user. Furthermore, as mentioned above, the second hand 3*s* is driven in 6-degree steps and can be rotated in the shortest time among the three hands 3 shown in this embodiment, so the time required to detect the hand position can be shortened. For this reason, it is preferable to perform hand position detection sequentially starting from the second hand 3*s*.

Figure 5:
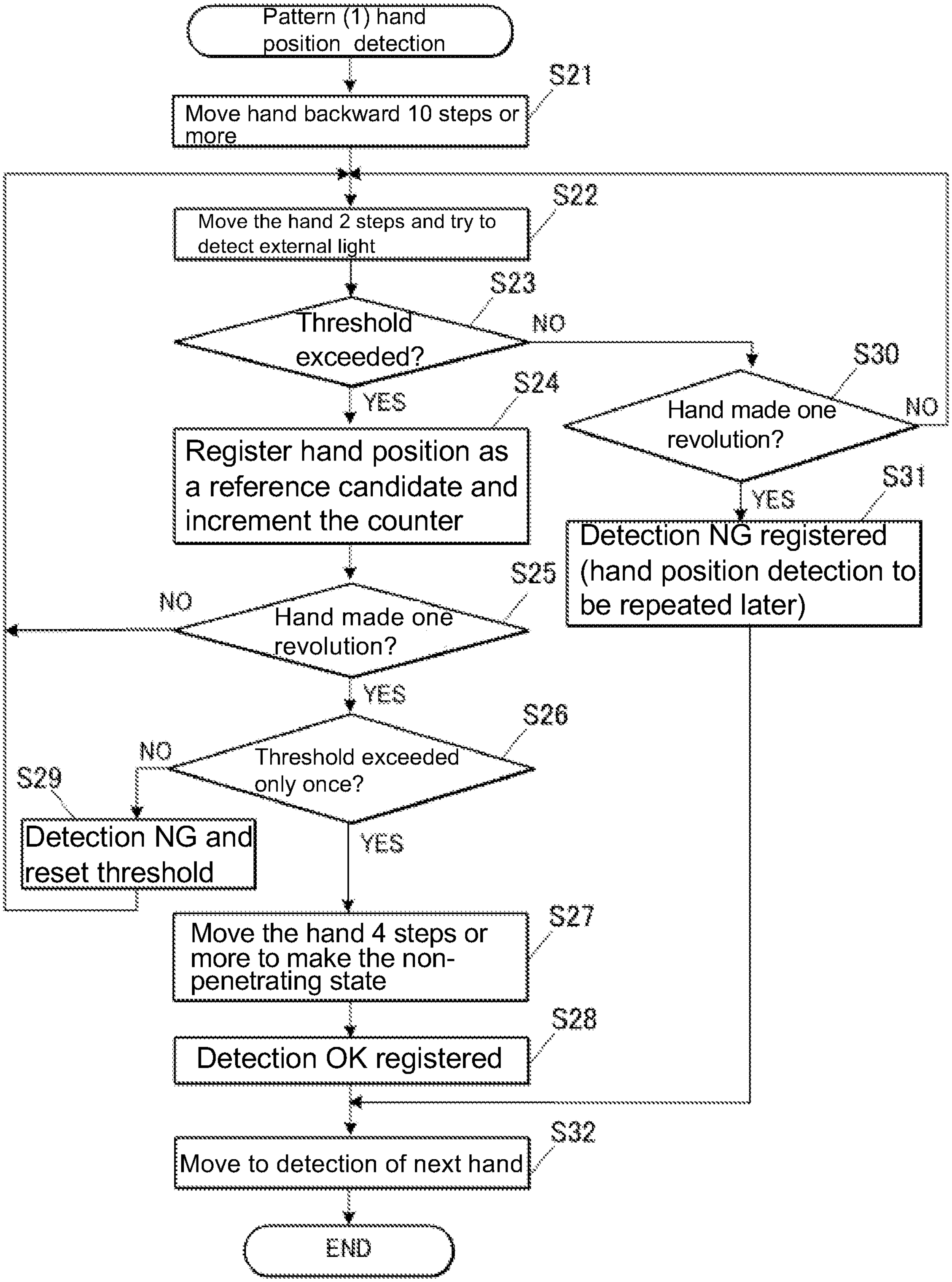
FIG. 5 is a flowchart showing a hand position detection processing according to pattern (1).

Hand position detection for the second hand 3*s* is performed by the hand position detection method of "pattern (1)" shown in FIG. 5 (step S8 in FIG. 4) (step S8). The hand position detection of "pattern (1)" includes a process of checking whether the threshold value has been set to an appropriate value, and a process of resetting the threshold value if it is not appropriate, as will be described later.

Figure 7:
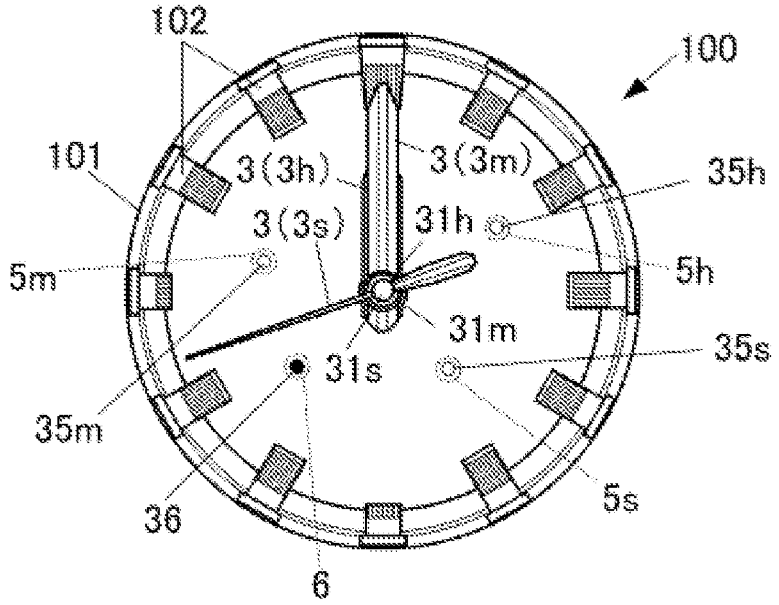
FIG. 7 is a schematic front view of the timepiece showing a state in which the second hand is moved back by 10 steps from the zero return position.

As shown in FIG. 5, when actually detecting the position of the second hand 3*s*, first, the hand 3 (second hand 3*s*) is moved backward (that is, rotated counterclockwise) by 10 steps or more (step S21). FIG. 7 shows a state in which only the second hand 3*s* has moved counterclockwise by 10 steps from the zero return state shown in FIG. 1. Note that the step S21 is not essential and can be omitted as appropriate.

Figure 8:
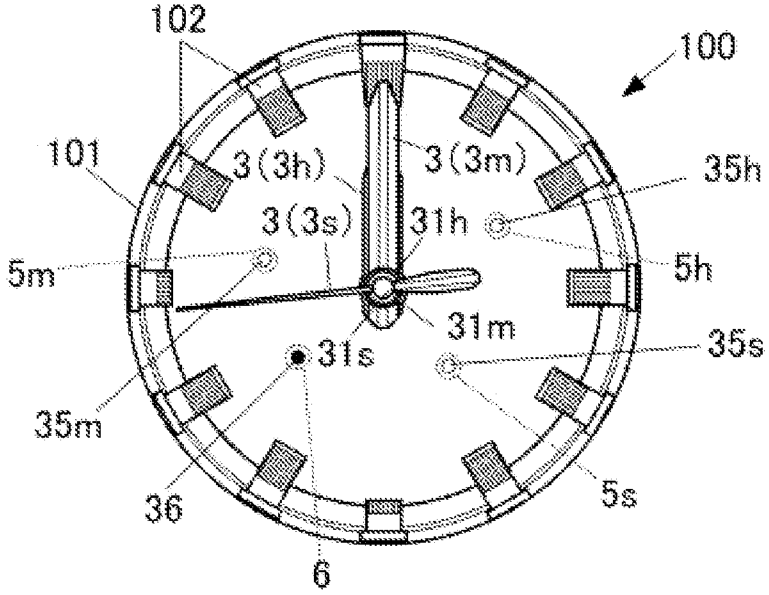
FIG. 8 is a schematic front view of the timepiece showing a state in which the second hand has been moved by two steps from the state shown in FIG. 7.

Then, the CPU 20 drives the first motor 32*s* to move the hand 3 (second hand 3*s*) clockwise, for example, by 2 steps at a time and causes the detection unit 5 (second hand position detection unit 5*s*) to attempt to detect external light at every two step (step S22). FIG. 8 is a schematic front view of the timepiece 100 showing a state in which the second hand 3*s* has been moved by two steps from the state shown in FIG. 7. Note that detection may be performed while moving the hand 3 (second hand 3*s*), and it is not essential to move the hand 3 (second hand 3*s*) by two steps. For example, detection may be performed while moving the hand one step at a time.

The CPU 20 determines whether or not the detection result of the detection unit 5 (second hand position detection unit 5*s*) exceeds the threshold (step S23), and if the detection result exceeds the threshold (step S23; YES), the CPU 20 registers the position of the second hand 3*s* as a candidate of a reference hand position. Then, the number of times the threshold value is exceeded is counted (step S24).

Figure 9:
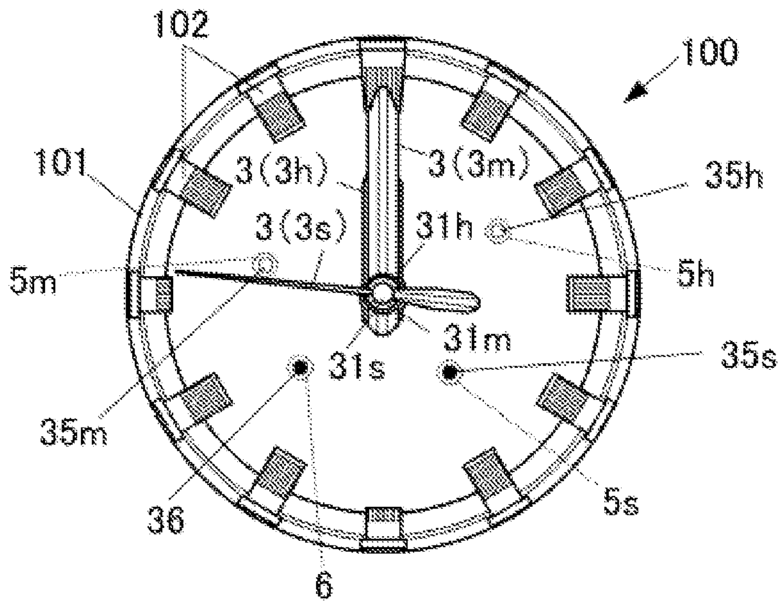
FIG. 9 is a schematic front view of the timepiece when the second hand is moved several steps from the state shown in FIG. 8 so that the light-transmissible section for detecting the position of the second hand is in the penetrating state.

Note that FIG. 9 is a schematic front view of the timepiece 100 in which the light-transmissible section 35*s* of the gears 37 that constitute the wheel train mechanism 33*s* of the second hand 3*s* drive mechanism (second hand drive mechanism 30*s*) is in the penetrating state. FIG. 16 is a main part sectional view schematically showing the light-transmissible section 35 (light-transmissible section 35*s*) and its surrounding area in which the through holes 371, 372, and 373 of the gears 37 constituting the wheel train mechanism 33 (the wheel train mechanism 33*s* in the case of the second hand 3*s*) overlap with each other and form the penetrating state.

The CPU 20 determines whether the hand 3 (second hand 3*s*) has been moved the number of steps required to make one revolution (move a predetermined distance) (step S25). If the number of steps for one round has not yet been completed (step S25; NO), the process returns to step S22 and repeats the process.

On the other hand, if the second hand 3*s* is moved by the number of steps required to make one revolution (step S25; YES), the CPU 20 further determines whether or not the number of times external light exceeding the threshold has been detected is one time while the second hand 3*s* is made one revolution (step S26).

Figure 10:
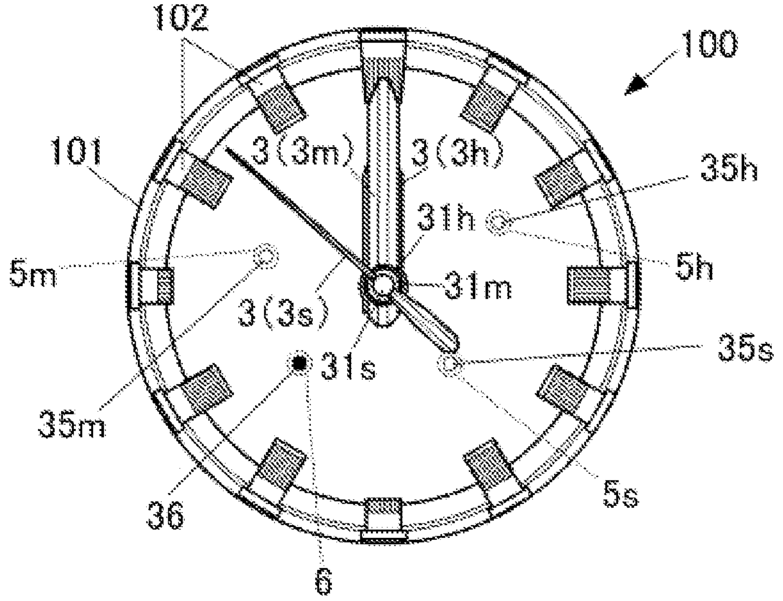
FIG. 10 is a schematic front view of the timepiece when the second hand is moved by 4 steps or more from the state shown in FIG. 9 so that the light-transmissible section for detecting the position of the second hand becomes the non-penetrating state.
Figure 17:
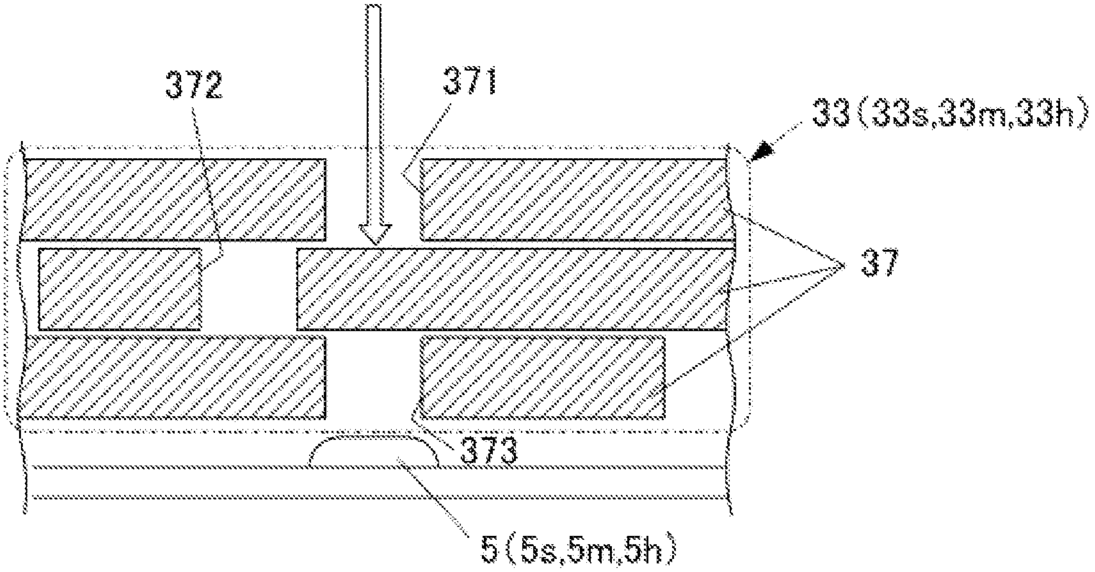
FIG. 17 is a cross-sectional view of a main part schematically showing the relationship between the wheel train mechanism and the detection unit when the light-transmissible section for detecting the hands position of the hands is in a non-penetrating state.

If the number of times external light has been detected is one time (step S26; YES), the position where external light greater than the threshold value is detected is set as the reference position of the hand 3 (second hand 3*s* in this embodiment), and then the hand is moved clockwise by 4 steps or more form the reference position to make the light-transmissible section 35*s* corresponding to the second hand 3*s* the non-penetrating state (e.g., the state shown in FIG. 17) (step S27). FIG. 10 is a schematic front view of the timepiece 100 in which the light-transmissible section 35*s* of the gears 37 that constitute the wheel train mechanism 33*s* of the second hand 3*s* drive mechanism (second hand drive mechanism 30*s*) is in the non-penetrating state. FIG. 17 is a cross-sectional view of a main part schematically showing the vicinity of the light-transmissible section 35 (the light-transmissible section 35*s*) that is in the non-penetrating state where the through holes 371, 372, and 373 of the gears 37 constituting the wheel train mechanism 33 (or the wheel train mechanism 33*s* in the case of the second hand 3*s*) are misaligned.

Note that it is sufficient that the positions of the through holes 371, 372, and 373 are shifted so that the light-transmissible section 35*s* is not penetrated, and so it is not necessary to move the hand clockwise by 4 steps or more. For example, it may be 2 steps.

When the detection by the second hand position detection unit 5*s* is performed successfully in this way, it is registered that the detection of the relevant hand 3 (second hand 3*s* in this embodiment) has been successful (step S28). On the other hand, if the number of times that external light has been detected is not once (step S26; NO), that is, if external light of more than the threshold is detected at multiple locations and multiple reference position candidates exist, the CPU 20 determines no good (NG) and the detection threshold is reset (step S29). Specifically, the threshold value is changed to make the detection level by the detection unit 5 (second hand position detection unit 5*s*) stricter, and the process returns to step S22 to perform the detection operation again.

Further, in step S23, if external light exceeding the threshold is not detected (step S23; NO), the CPU 20 determines whether or not the hand 3 (second hand 3*s*) has been moved the number of steps enough to make one revolution (Step S30). If the number of steps for one round has not yet been moved (step S30; NO), the process returns to step S22 and repeats the process.

On the other hand, when the second hand 3*s* is moved by the number of steps required to make one revolution (step S30; YES), that is, when the external light exceeding the threshold value cannot be detected at any point even after the second hand 3*s* is made one revolution, other hands 3 may be covering the light-transmissible section 35*s*, or the shadow of another hand 3 may be over the position of the light-transmissible section 35*s*, which impede detection. That is, even if the other hands 3 do not completely cover the light-transmissible section 35, depending on the angle at which the external light is incident, the shadow of the hand 3 may be cast, lowering the illuminance level of the external light.

Figure 18:
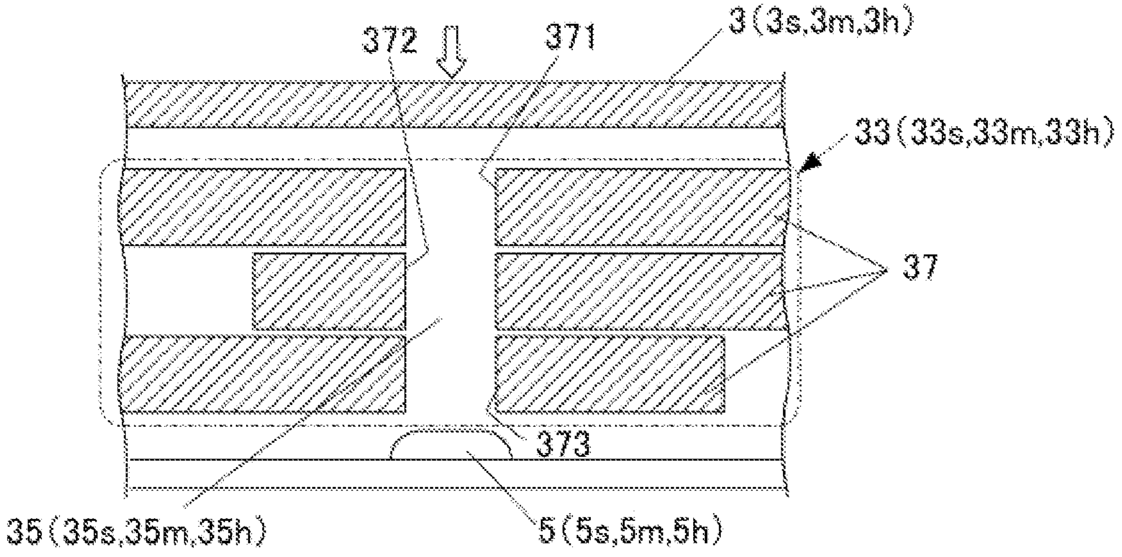
FIG. 18 is a cross-sectional view of a main part schematically showing a state in which a hand is blocking the light-transmissible section for detecting the hand position of the hand that is in the penetrating state.

For example, as shown in FIG. 18, although the through holes 371, 372, and 373 of the gear 37 overlap and the light-transmissible section 35 is in the penetrating state, a hand 3 may be placed above the light-transmissible section 35, so the light-transmissible section 35 is in the shadow of the hand 3, and external light is blocked and does not reach the detection part 5. In this case, the hand 3 that covered the light-transmissible section 35 will likely move to a different position after the hand positions have been detected for all the hands 3. Therefore, in such a case, the CPU 20 causes that the hand 3 (second hand 3*s*) to be detected again after the detection operation of the other hands 3 are performed (step S31).

Then, if detection is successful for hand 3 (second hand 3*s* in this embodiment) (step S28), or even if hand 3 (second hand 3*s*) is rotated once, if external light exceeding the threshold cab not be detected at any point (step S31), the CPU 20 temporarily ends the hand position detection operation for the second hand 3*s*, and moves on to the detection operation for the next hand 3 (e.g., the minute hand 3*m* in FIG. 4) (step S32).

For example, when detecting the hand positions in the order of the second hand 3*s*, minute hand 3*m*, and hour hand 3*h*, even if the second hand 3*s* is detected unsuccessfully (NG), the detection will proceed to the minute hand 3*m* and hour hand 3*h*. And after the hand detection process for these hands 3 have been performed, the hand detection process for the second hand 3*s* is repeated. This way, it is possible to avoid a situation where the minute hand 3*m* and/or hour hand 3*h* happen to block the light-transmissible section 35*s* of the second hand 3*s*, preventing the hand position detection of the second hand 3*s*.

Figure 6:
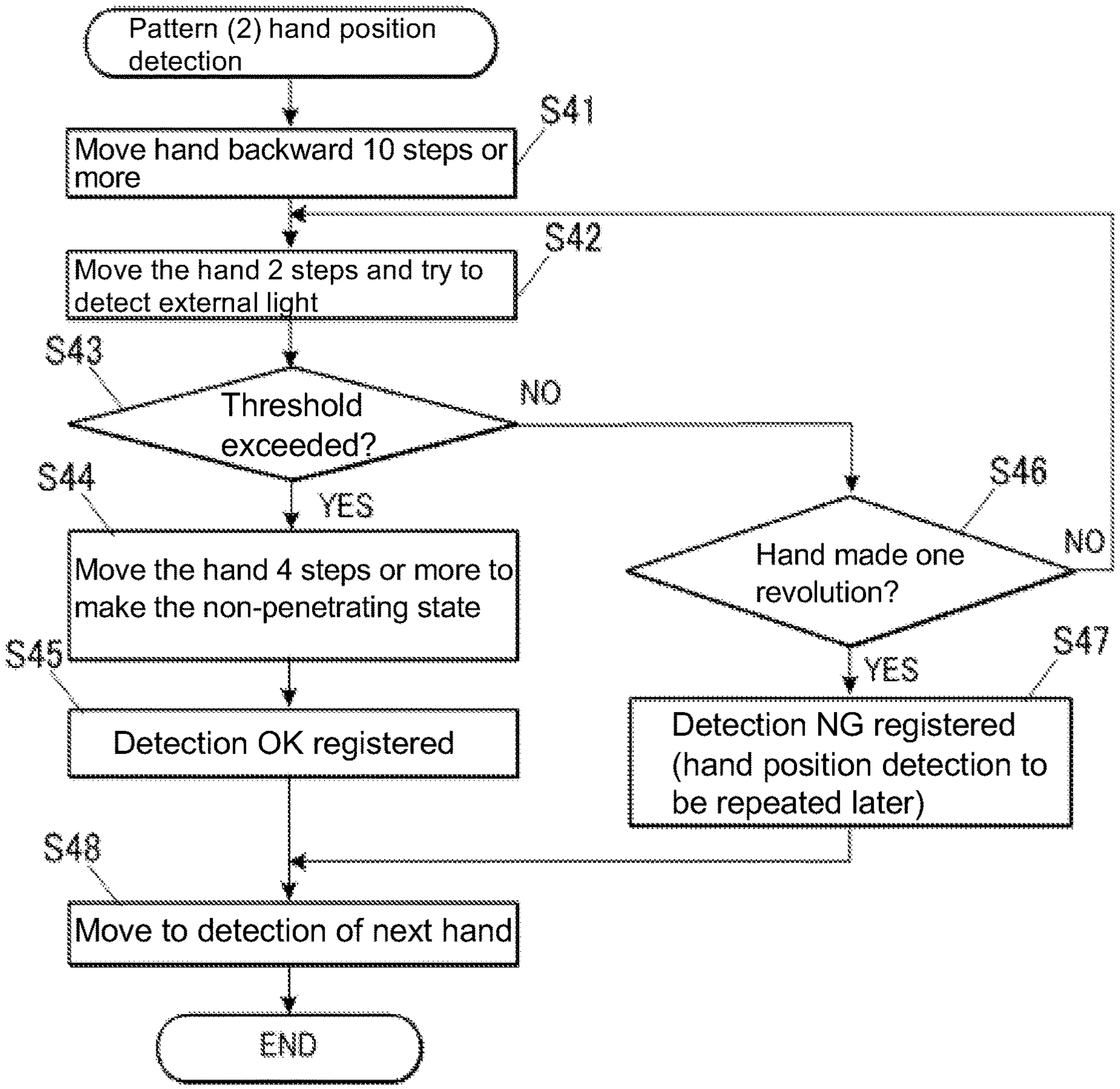
FIG. 6 is a flowchart showing a hand position detection processing according to pattern (2).

As shown in FIG. 4, the hand position detection for the minute hand 3*m* (step S9) is different from that for the second hand 3*s*, and is performed by the hand position detection method of "pattern (2)" shown in FIG. 6 (step S10). Note that the hand position detection of "pattern (2)" follows the detection threshold set in the hands position detection of "pattern (1)" in this embodiment.

Figure 12:
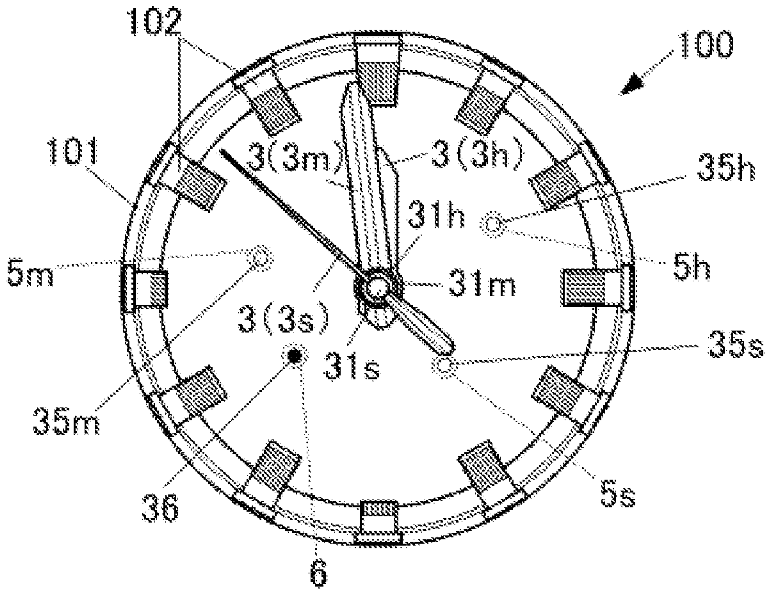
FIG. 12 is a schematic front view of the timepiece when the minute hand is moved by 4 steps or more from the state shown in FIG. 10 so that the light-transmissible section of the minute hand for detecting the position of the minute hand becomes the non-penetrating state.

As shown in FIG. 6, when actually detecting the position of the minute hand 3*m*, the hand 3 (minute hand 3*m*) is first moved backward (that is, rotated counterclockwise) by 10 steps or more (step S41). FIG. 12 shows how only the minute hand 3*m* is rotated counterclockwise in 10 steps from the zero position from the state shown in FIG. 10 (the hour hand 3*h* is at the zero position and the second hand 3*s* is stopped at the position where the hand position detection operation has been completed). Note that the process of step S41 is not essential like the process of step S21, and can be omitted as appropriate.

Then, the CPU 20 drives the second motor 32*m* to detect external light using the detection unit 5 (minute hand position detection unit 5*m*) while moving the hand 3 (minute hand 3*m*) clockwise by 2 steps (step S42).

Figure 11:
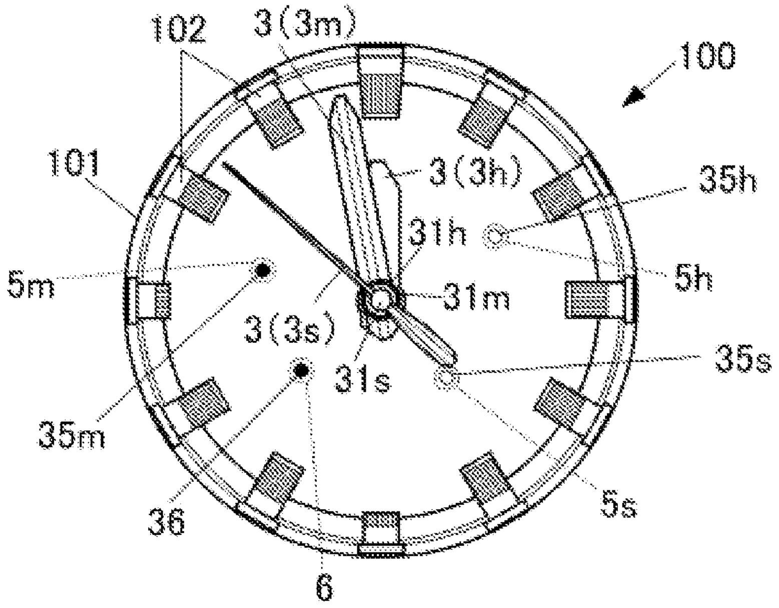
FIG. 11 is a schematic front view of the timepiece when the light-transmissible section for detecting the position of the minute hand is in the penetrating state.

The CPU 20 determines whether the detection result of the detection unit 5 (minute hand position detection unit 5*m*) exceeds a threshold (step S43). If the detection result exceeds the threshold (step S43; YES), the CPU 20 sets the position where external light exceeding the threshold is detected as the reference position of the hand 3 (minute hand 3*m* in this embodiment). For example, FIG. 11 is a schematic front view diagram of the timepiece 100 in which the light-transmissible section 35*m* of the gears 37 constituting the wheel train mechanism 33*m* of the minute hand 3*m* drive mechanism (minute hand drive mechanism 30*m*) is in the penetrating state (e.g., the state shown in FIG. 16).

Once the reference position for the minute hand 3*m* is determined, the CPU 20 moves the minute hand 3*m* clockwise by 4 steps or more from the reference position, and brings the light-transmissible section 35*m* corresponding to the minute hand 3*m* into the non-penetrating state (e.g., the state shown in FIG. 17) (step S44). FIG. 12 is a schematic front view of the timepiece 100 in which the light-transmissible section 35*m* of the gears 37 that constitute the wheel train mechanism 33*m* of the minute hand 3*m* drive mechanism (minute hand drive mechanism 30*m*) is in the non-penetrating state. Note that it is sufficient that the positions of the through holes 371, 372, and 373 are shifted so that the light-transmissible section 35*m* is not penetrated, and it is not necessary to move the through holes 371, 372, and 373 clockwise by 4 steps or more. For example, it may be 2 steps.

When the minute hand position detection unit 5*m* successfully performs detection in this way, it is registered that the detection has been successful for the corresponding hand 3 (minute hand 3*m* in this embodiment) (step S45). On the other hand, if the detection result of the detection unit 5 (minute hand position detection unit 5*m*) does not exceed the threshold (step S43; NO), the CPU 20 determines whether or not the hand 3 (minute hand 3*m*) is moved by the number of steps for one revolution (a predetermined distance) (step S46). If the hand 3 (minute hand 3 *m*) has not yet been moved by the number of steps for one revolution (step S46; NO), the process returns to step S42 and repeats the process.

On the other hand, when the minute hand 3*m* is moved by the number of steps required to make one revolution (step S46; YES), that is, when hand 3 (minute hand 3*m*) is made one revolution, but if no external light exceeding the threshold value is detected at any point, then there is a possibility that other hand 3 covers the light-transmissible section 35*m* and obstruct detection. Therefore, the CPU 20 determines that the hand 3 (minute hand 3*m*) position should be detected again after the detection operation of the other hands 3 (step S47) is performed.

Then, if detection is registered as successful for hand 3 (minute hand 3*m* in this embodiment) (step S45), or even if hand 3 (minute hand 3*m*) is rotated once, external light exceeding the threshold can not be detected at any point (step S47), the CPU 20 temporarily ends the hand position detection operation for the minute hand 3*m* and moves on to the detection operation for the next hand 3 (e.g., the hour hand 3*h* in FIG. 4) (step S48).

As shown in FIG. 4, the hand position detection for the hour hand 3*h* (step S11) is performed by the hand position detection method of "pattern (2)" shown in FIG. 6, as in the case of the minute hand 3*m* (step S12). Note that the hand position detection in "pattern (2)" for the hour hand 3*h* is the same as that for the minute hand 3*m*, and it is also possible to omit the process of step S41 as appropriate, as in the case of the minute hand 3*m*.

As shown in FIG. 6, the CPU 20 drives the third motor 32*h* to move the hand 3 (hour hand 3*h*) clockwise in 2 steps at a time and attempts to detect external light by the detection unit 5 (hour hand position detection unit 5*h*) (step S42).

Figure 13:
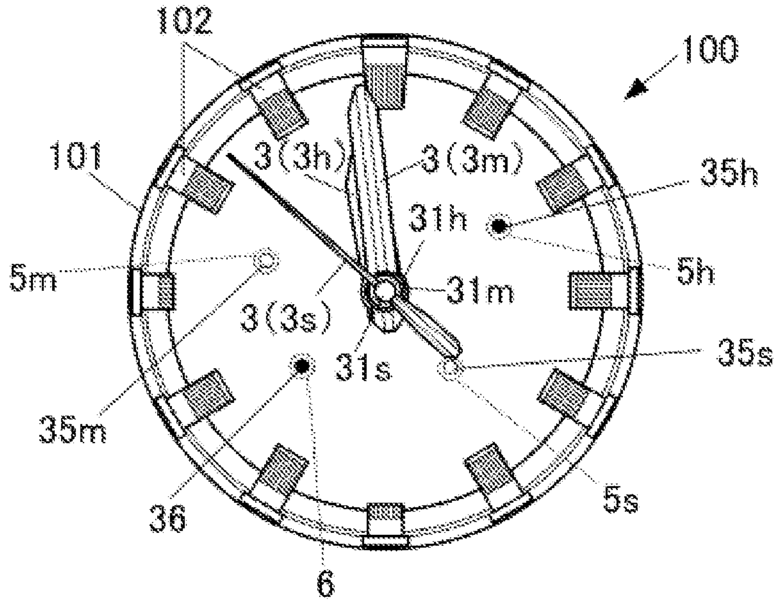
FIG. 13 is a schematic front view of the timepiece when the light-transmissible section for detecting the position of the hour hand is in the penetrating state.

FIG. 13 is a schematic front view showing a state in which the second hand 3*s* and the minute hand 3*m* are stopped at the respective positions where the respective hand position detection operations have been completed, the hour hand 3*h* is moved, for example, by 2 steps, and the light-transmissible section 35*h* of the gears 37 constituting the wheel train mechanism 33*h* of the hour hand 3*h* drive mechanism (hour hand drive mechanism 30*h*) becomes the penetrating state (e.g., the state shown in FIG. 16).

Figure 14:
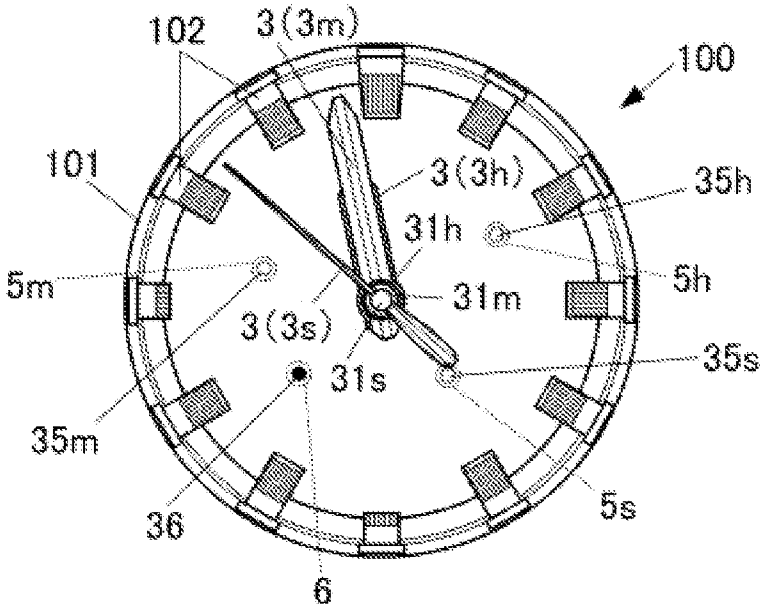
FIG. 14 is a schematic front view of the timepiece when the hour hand is moved by 4 steps or more from the state shown in FIG. 13 so that the light-transmissible section for detecting the position of the hour hand becomes the non-penetrating state.
Figure 15:
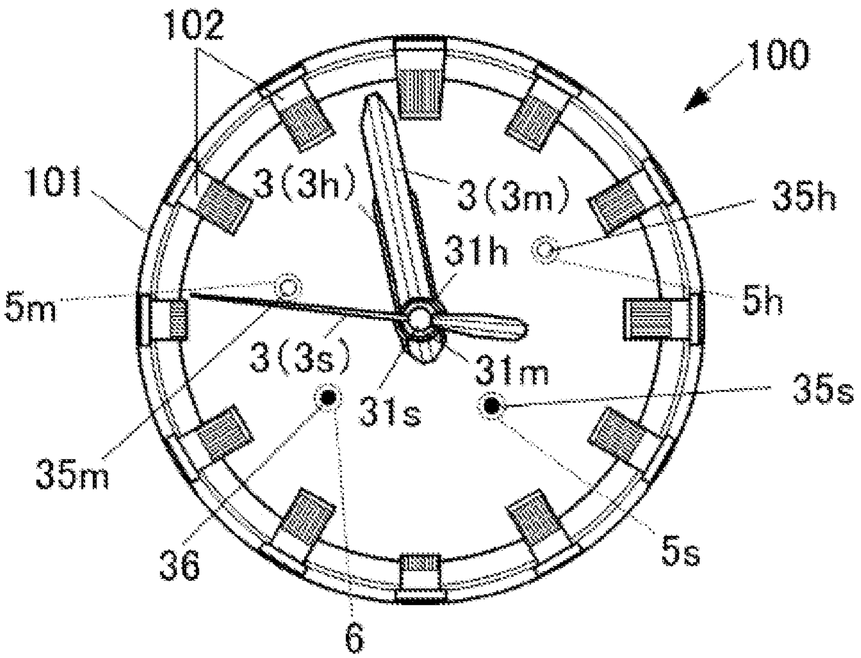
FIG. 15 is a schematic front view of the timepiece in a case where, after detecting the positions of the minute hand and the hour hand, the light-transmissible section for detecting the position of the second hand becomes the penetrating state in a subsequent repeated detection operation.

When the reference position for the hour hand 3*h* is determined, the CPU 20 moves the hour hand 3*h* clockwise by 4 steps or more from the reference position, and brings the light-transmissible section 35*h* corresponding to the hour hand 3*h* into the non-penetrating state (e.g., the state shown in FIG. 17) (step S44). FIG. 14 is a schematic front view of the timepiece 100 in which the light-transmissible section 35*h* of the gears 37 that constitute the wheel train mechanism 33*h* of the hour hand 3*h* drive mechanism (hour hand drive mechanism 30*h*) is in the non-penetrating state. Note that it is only necessary that the positions of the through holes 371, 372, and 373 are shifted so that the light-transmissible section 35*h* is in the non-penetrating state (the state shown in FIG. 17), and it is not necessary to move the through holes 371, 372, and 373 clockwise by 4 steps or more. For example, it may be 2 steps.

When the detection by the hour hand position detection unit 5*h* is performed successfully in this way, it is registered that the detection has been successful for the corresponding hand 3 (hour hand 3*h* in this embodiment) (step S45).

Note that the other hand position detection processing for the hour hand 3*h* is the same as that for the minute hand 3*m*, so the description thereof will be omitted.

Returning to FIG. 4, the CPU 20 determines whether or not all the hands 3 (second hand 3*s*, minute hand 3*m*, hour hand 3*h*) have failed in detection (NG) (step S13). If all the hands 3 are detected unsuccessfully (step S13; YES), it is determined that the environment in which the timepiece 100 is placed is not suitable for hand position detection, and the detection operation is ended (step S13; YES) (Step S4).

In this case, all the hands 3 (second hand 3*s*, minute hand 3*m*, hour hand 3*h*) are returned to the 12 o'clock position (step S5), and the hand position detection process is ended.

Note that the process to be performed in the case where the second hand 3*s*, the minute hand 3*m*, and the hour hand 3*h* all have a detection failure (NG) is not limited to the above example. For example, each hand 3 may block the light-transmissible section 35 of another hand. Therefore, by taking into account the influence of the entire hand 3 (from the tip to the tail at the rear end), after such overall failure, each hand 3 may be moved by a minimum amount of less than 90 degrees, and the hand position detection operation may be performed again for each hand 3.

On the other hand, if not all the hands 3 were detected unsuccessfully, that is, if there was a hand 3 for which the detection unit 5 was able to detect external light above the threshold value and there was another hand 3 for which external light above the threshold value was not detected (step S13; NO), the detection operation is performed again using hand 3 position detection method of "pattern (2)" shown in FIG. 6 (step S14).

The CPU 20 determines whether or not external light greater than the threshold for the hand 3, which had the previous detection failure (NG), is now detected (step S15), and if the detection is not OK (step S15; NO), the detection failure for that hand 3 is maintained (the judgment of detection NG in step S31 of FIG. 5 or step S47 of FIG. 6 is maintained), and all the hands 3 (second hand 3*s*, minute hand 3*m*, hour hand 3*h*) are moved to the 12 o'clock position (step S5), and the hand position detection process is ended.

If the detection becomes OK (step S15; YES), the position where the detection unit 5 can detect external light of more than the threshold value is registered as the reference position of the hand 3 (step S16). Then, the CPU 20 determines whether there is another hand 3 that has been detected unsuccessfully (NG) (step S17), and if there is another hand 3 that has been detected unsuccessfully (NG) (step S17; YES), the process returns to step S14 and the process is repeated.

On the other hand, if there are no other hands 3 that were detected unsuccessfully (NG) (step S17; NO), all the hands 3 (second hand 3*s*, minute hand 3*m*, hour hand 3*h*) are returned to the 12 o'clock position (step S5), and the hand position detection process ends.

As described above, if there is a hand 3 in which external light above the threshold value is detected at multiple locations although it should be detected at only one location, the setting of the threshold value may not be appropriate. Therefore, in this embodiment, the threshold value is reset and then the detection operation is performed again.

Conversely, if there is no position where external light exceeding the threshold value is detected for a first hand 3 (e.g., the second hand 3*s*) in the multi-hand timepiece 100 having a plurality of hands 3, there may be a case where the light-transmissible section 35 corresponding to the hand 3 is in the shadow of another hand 3 (e.g., the minute hand 3*m* or the hour hand 3*h*), thereby preventing detection. In this case, an attempt is made to detect the position of the first hand 3 (e.g., the second hand 3*s*) in a state that the other hands 3 (e.g., the minute hand 3*m* or the hour hand 3*h*) do not obstruct the first hand 3.

As a result, highly reliable detection results can be obtained even when the hand position is detected using external light without providing an LED or the like.

As described above, according to the present embodiment, a plurality of hands 3, the plurality of detection units 5 arranged corresponding to the plurality of hands 3 for detecting external light, and the CPU 20 as a control unit are provided. While moving a first hand 3 (e.g., second hand 3*s*) among the plurality of hands 3 by a predetermined distance, the CPU 20 determines whether or not external light of a threshold value or more is detected by the detection unit 5 (e.g., second hand position detection unit 5*s*) corresponding to first hand 3 (e.g., second hand 3*s*). Also while moving another hand 3 (e.g., the minute hand 3*m* or the hour hand 3*h*) among the plurality of hands 3 by a predetermined distance, the CPU determines whether or not external light exceeding a threshold value has been detected by the detection unit of the another hand (e.g., minute hand position detection unit 5*m* or hour hand position detection unit 5*h*) corresponding to the another hands 3 (e.g., minute hand 3*m* or hour hand 3*h*). When there is a hand that was able to detect external light above the threshold value by detection unit 5 and there is another hand that was unable to detect external light above the threshold value, the detection operation is performed again for the another hand 3 that was unable to detect external light above the threshold value.

In this way, if there is a detection failure, by performing detection again, it becomes possible to appropriately perform reliable hand position detection.

Furthermore, since the detection unit 5 that detects the hand position detects external light, there is no need to provide a light emitting element such as an LED, and there is no need for a space for arranging a light emitting element or a board on which the light emitting element is arranged. This contributes to miniaturization of the timepiece 100. Furthermore, it is no longer necessary to arrange a substrate on which a light receiving element is mounted on the gears 37, and the degree of freedom in the design of the timepiece 100 is thereby improved.

Further, in this embodiment, the timepiece 100 includes a reference illuminance detection unit 6 that detects the illuminance of external light, and when the detection result by the reference illuminance detection unit 6 is an illuminance outside a predetermined range, detection by the detection unit 5 is not performed.

The environment in which the detection unit 5 can detect the hand position well is when the external environment in which the timepiece 100 is placed has an illuminance of 500 Lx or more to about 50,000 Lx. Therefore, the reliability of the detection results can be ensured by not performing hand position detection in an environment with an illuminance outside this predetermined range.

Further, the threshold value for the detection operation by the detection unit 5 may be set according to the illuminance of external light detected by the reference illuminance detection unit 6. In this case, it is possible to realize appropriate hand position detection according to the environment.

Further, the CPU 20 of the present embodiment determines that there is a detection failure if there is a hand 3 for which the detection unit 5 detects external light of a threshold value or more twice or more while the hand 3 is moved a predetermined distance.

While each hand 3 makes one rotation (one revolution) around the axis, the through holes (through holes 371, 372, 373 in FIGS. 2 and 16) of the gears 37 that constitute the wheel train mechanism 33 overlap with each other at only one point to form a light-transmissible section 35 in the penetrating state, which is a penetrating position that penetrates in the thickness direction of the timepiece and allows external light to be taken in. Therefore, if external light above the threshold is detected at two or more locations during one rotation (one round) of the hand 3, that possibly means that external light was detected at a location that is not supposed to be in the penetrating state, and the threshold value was not set appropriately.

In this embodiment, by treating such a case as a detection failure, it is possible to avoid unreliable detection.

Furthermore, when there is a hand 3 for which the detection unit 5 detects external light of a threshold value or more twice or more, the CPU 20 of this embodiment may change the threshold value to make the detection level stricter and executes the detection operation again.

As a result, if external light exceeding the threshold value is detected at multiple locations due to inappropriate setting of the threshold value, an appropriate threshold value can be set so that the detection unit 5 detects external light exceeding the threshold value only at the light-transmissible section 35 in the penetrating state, and re-detection can be performed appropriately. Therefore, highly reliable hand position detection can be performed.

Further, if the CPU 20 of the present embodiment changes the threshold value to make the detection level in the detection unit 5 stricter, and successfully executes the detection operation again while moving the first hand 3 (e.g., the second hand 3*s*) by a predetermined distance—i.e., the detection unit 5 detects external light that is equal to or higher than the threshold once, and if thereafter the detector 5 detects external light equal to or higher than the threshold twice or more for another hand 3 (e.g., the minute hand 3 *m*), the detection operation is canceled.

If the first hand 3 (e.g., the second hand 3*s*) can be detected correctly, there is a high possibility that the threshold value itself was set appropriately. However, if the another hand 3 (e.g., the minute hand 3*m*) fails to be detected properly, there is a possibility that the failure occurs due to a factor different from the threshold setting. In this case, since the reliability of the detection operation cannot be ensured, the detection operation is stopped. This way, it is possible to prevent the hand position detection from continuing inappropriately or unstably.

Further, in this embodiment, the plurality of hands 3 are rotationally driven via a wheel train mechanism 33 including a plurality of gears 37, and the gear 37 has a through hole (see through-holes 371, 372, 373 in FIG. 2, FIG. 16, etc.) that penetrates in the thickness direction. The plurality of detection units 5 are provided at the respective penetrating positions where the through-holes 371, 372, 373 of the gears 37 that rotationally drive the corresponding hands 3 respectively overlap and are in the penetrating state (that is, at the position where the light-transmissible section 35 in the penetrating state is formed). Then, external light is detected by the detection unit through the through holes 371, 372, 373 (the light-transmissible section formed by the overlapping through holes 371, 372, 373 at the penetrating position 35).

As a result, the hand position can be detected using the gears 37 of the wheel train mechanism 33 that drives the hand 3, and the number of parts can be reduced compared to the case where a light receiving element or the like needs to be provided. This configuration therefore contributes to miniaturization and weight reduction.

Further, in this embodiment, while a detection operation is being performed by one detecting unit 5 (e.g., second hand position detecting unit 5*s*) corresponding to first hand 3 (e.g., second hand 3*s*), the through-holes 371, 372, and 377 of the gears 37 for the other hands are made in the non-penetrating state.

As a result, it is possible to prevent erroneous detection situation in which the detection unit 5 (for example, the second hand position detection unit 5*s*) erroneously detects external light entering from the light-transmissible sections 35 corresponding to the other hands 3 (e.g., the minute hand 3*m* and the hour hand 3*h*). Therefore, highly reliable hand position detection can be performed.

Modified Examples

Although the embodiments of the present invention have been described above, it goes without saying that the present invention is not limited to these embodiments and can be modified in various ways without departing from the spirit thereof.

For example, in the above embodiment, only the hand position detection for the first hand 3 (e.g., the second hand 3*s*) is performed using "pattern (1)", and the hand position detection for the other hands 3 (e.g., the minute hand 3*m* and the hour hand 3*h*) is performed using the threshold value determined in the hand position detection for the first hand 3 (e.g., the second hand 3*s*). However, the hand position detection process of the present invention is not limited to this.

For example, the hand position detection may be performed for other hands 3 (e.g., the minute hand 3*m* and the hour hand 3*h*) using "pattern (1)" so that it can be determined whether the threshold value is appropriate or not for each of the hands, and if it is determined as inappropriate, the detection may be performed again.

Here, in order to judge whether the threshold value is appropriate, it is necessary to rotate the hand 3 for a whole round and to check whether or not there is a detection exceeding the threshold value at two or more locations. For this reason, if the hand position detection based on "pattern (1)" is performed for each hand 3, it will take time to complete the detection operation for all the hands 3. However, if the detection operation is performed at a time when the user is not expected to look at the timepiece 100, such as at night, this effect will be small even if it takes some time. By performing a detection operation while checking the appropriateness of the threshold value for each hand 3, more accurate and reliable detection results can be obtained.

Furthermore, in the above embodiment, when detecting the hand position using "pattern (1)" for the first hand 3 (e.g., the second hand 3*s*), the hand 3 is made to go around once (one revolution), for example. But in order to check whether the threshold value is appropriate, it is not essential to make the hand 3 go around once (one revolution). If external light exceeding the threshold is detected at two or more locations, it can be said that the threshold is inappropriate (that is, the level of the threshold is too low). Therefore, the threshold value may be reset (see step S29 in FIG. 5) at the moment when the second location is detected.

In addition, if the threshold value is to be reset (see step S29 in FIG. 5) when the second position is detected even before the hand 3 has made one revolution, the threshold value can be reset without taking much time. Therefore, with this scheme, even when detecting the hand positions of other hands 3 (e.g., the minute hand 3*m* and the hour hand 3*h*), it is also possible to determine whether the threshold value is appropriate or not, and to reset the threshold value if it is inappropriate.

In addition, in this embodiment, when there is a hand 3 (first hand, e.g., second hand 3*s*) among the plurality of hands 3 that cannot detect external light exceeding the threshold value, after hand position detection for the other hands 3 (e.g., minute hand 3*m*, hour hand 3*h*) are completed, the detection operation for the first hand (e.g., the second hand 3*s*) is performed again. But the timing at which the detection operation is performed again for the first hand (e.g., the second hand 3*s*) is not limited to this example.

For example, when the detection operation is performed in the order of the second hand 3*s*, the minute hand 3*m*, and the hour hand 3*h*, if the CPU 20, which is the control unit, cannot detect external light above the threshold for the first hand 3 (e.g., the second hand 3*s*) at the corresponding detection unit 5 (e.g., second hand position detection unit 5*s*) while the first hand is being moved by a predetermined distance, the CPU may causes the other hands to move predetermined distances and perform the external light detection operation for the first hand 3 again.

That is, in this case, if the hand position detection for the first hand 3 (e.g., the second hand 3*s*) fails to detect external light above the threshold value, before moving on to detect the next hand 3 (e.g., the minute hand 3*m*, etc.), the other hands 3 (e.g., the minute hand 3*m* and the hour hand 3*h*) that are considered to be affecting the detection failure of the first hand 3 (e.g., the second hand 3*s*) may be moved several steps and re-detection for the first hand 3 may be attempted again. For example, if it is determined that the minute hand 3*m* is the other hand 3 that is thought to be affecting the detection failure of the first hand 3 (e.g., the second hand 3*s*), the minute hand 3*m* is rotated 90 degrees and the hand position detection for the second hand 3*s* is performed again.

In this case, the first hand 3 (e.g., the second hand 3*s*) can be redetected without waiting for the detection results for the other hands 3 (e.g., the minute hand 3*m* and the hour hand 3*h*), thereby making it possible to perform the hand position detection for the first hand 3 quickly.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic timepiece, comprising: a plurality of hands; a plurality of detection units that detect external light, arranged corresponding to the plurality of hands; a control unit, wherein the control unit is configured to perform the following: performing external light detection operations that respectively determine whether or not external light of a threshold value or more is detected at the plurality of detection units while moving the plurality of hands by a predetermined distance, respectively, and when there is a hand among the plurality of hands for which the external light detection operation detected external light and there is another hand among the plurality of hands for which the external light detection operation did not detect external light, performing the external light detection operation for said another hand again; and a reference illuminance detection unit that detects an illuminance of external light, wherein when a detection result by the reference illuminance detection unit is an illuminance outside a predetermined range, the external light detection operations are not performed.

2. The electronic timepiece according to claim 1, wherein a threshold for one or more of the external light detection operations is determined according to the illuminance detected by the reference illuminance detection unit.

3. The electronic timepiece according to claim 2, wherein when there is a hand among a plurality of hands for which the corresponding detection unit detected external light of the threshold value or more twice or more while said hand was moved by the predetermined distance, the control unit determines that the external light detection operation failed for said hand.

4. The electronic timepiece according to claim 3, wherein when there is a hand among a plurality of hands for which the corresponding detection unit detected external light of the threshold value or more twice or more while said hand was moved by the predetermined distance, the control unit causes the corresponding detection unit to attempt to detect external light again with a stricter threshold value that is changed from the threshold value.

5. The electronic timepiece according to claim 4, wherein when the corresponding detection unit detected external light with the stricter threshold value only once while said hand was moved by the predetermined distance, and when thereafter, for another hand, the corresponding detection unit detected external light twice or more while said another hand is moved by the corresponding predetermined distance, the control unit stops the external light detection operations.

6. The electronic timepiece according to claim 5, wherein each of the plurality of hands is rotationally driven via a wheel train mechanism including a plurality of gears, wherein the gears in each wheel train mechanism are provided with a plurality of through-holes, respectively, that penetrates in a thickness direction, and wherein each of the plurality of detection units detects external light when the plurality of through-holes are aligned to form a light transmissive passage.

7. The electronic timepiece according to claim 6, wherein while the external light detection operation is being performed by one of the plurality of detection units corresponding to one hand among the plurality of hands, the through holes of the gears that rotationally drive the hands other than said one hand are kept in a non-penetrating state so as not to allow passage of the external light.

8. A method for hand position detection executed by a control unit of an electronic timepiece comprising, in addition to the control unit, a plurality of hands and a plurality of detection units that detect external light, arranged corresponding to the plurality of hands, the method comprising: performing external light detection operations that respectively determine whether or not external light of a threshold value or more is detected at the plurality of detection units while moving the plurality of hands by a predetermined distance, respectively, and when there is a hand among the plurality of hands for which the external light detection operation detected external light and there is another hand among the plurality of hands for which the external light detection operation did not detect external light, performing the external light detection operation for said another hand again, wherein the electronic timepiece further includes a reference illuminance detection unit that detects an illuminance of external light, and wherein when a detection result by the reference illuminance detection unit is an illuminance outside a predetermined range, the external light detection operations are not performed.

9. The method according to claim 8, wherein a threshold for one or more of the external light detection operations is determined according to the illuminance detected by the reference illuminance detection unit.

10. The method according to claim 9, wherein when there is a hand among a plurality of hands for which the corresponding detection unit detected external light of the threshold value or more twice or more while said hand was moved by the predetermined distance, the external light detection operation is determined to have failed for said hand.

11. The method according to claim 10, wherein when there is a hand among a plurality of hands for which the corresponding detection unit detected external light of the threshold value or more twice or more while said hand was moved by the predetermined distance, the corresponding detection unit is caused to attempt to detect external light again with a stricter threshold value that is changed from the threshold value.

12. The method according to claim 11, wherein when the corresponding detection unit detected external light with the stricter threshold value only once while said hand was moved by the predetermined distance, and when thereafter, for another hand, the corresponding detection unit detected external light twice or more while said another hand is moved by the corresponding predetermined distance, the external light detection operations are stopped.

13. A non-transitory computer readable storage medium that stores a program executable by a control unit of an electronic timepiece that comprises, in addition to the control unit, a plurality of hands and a plurality of detection units that detect external light, arranged corresponding to the plurality of hands, the program causing the control unit to perform the following: performing external light detection operations that respectively determine whether or not external light of a threshold value or more is detected at the plurality of detection units while moving the plurality of hands by a predetermined distance, respectively, and when there is a hand among the plurality of hands for which the external light detection operation detected external light and there is another hand among the plurality of hands for which the external light detection operation did not detect external light, performing the external light detection operation for said another hand again, wherein the electronic timepiece further includes a reference illuminance detection unit that detects an illuminance of external light, and wherein when a detection result by the reference illuminance detection unit is an illuminance outside a predetermined range, the external light detection operations are not performed.

14. The storage medium according to claim 13, wherein a threshold for one or more of the external light detection operations is determined according to the illuminance detected by the reference illuminance detection unit.

15. The storage medium according to claim 13, wherein when there is a hand among a plurality of hands for which the corresponding detection unit detected external light of the threshold value or more twice or more while said hand was moved by the predetermined distance, the external light detection operation is determined to have failed for said hand.

16. The storage medium according to claim 15, wherein when there is a hand among a plurality of hands for which the corresponding detection unit detected external light of the threshold value or more twice or more while said hand was moved by the predetermined distance, the corresponding detection unit is caused to attempt to detect external light again with a stricter threshold value that is changed from the threshold value.

17. The storage medium according to claim 16, wherein when the corresponding detection unit detected external light with the stricter threshold value only once while said hand was moved by the predetermined distance, and when thereafter, for another hand, the corresponding detection unit detected external light twice or more while said another hand is moved by the corresponding predetermined distance, the program causes the control unit to stop the external light detection operations.

* * * * *